United States Patent
Lin

(10) Patent No.: US 10,807,179 B2
(45) Date of Patent: Oct. 20, 2020

(54) METHOD OF BUILD-UP WELDING

(71) Applicant: GENERAL ELECTRIC COMPANY, Schenectady, NY (US)

(72) Inventor: Dechao Lin, Greer, SC (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 590 days.

(21) Appl. No.: 15/435,932

(22) Filed: Feb. 17, 2017

(65) Prior Publication Data
US 2018/0236583 A1   Aug. 23, 2018

(51) Int. Cl.
| | |
|---|---|
| B23K 9/04 | (2006.01) |
| B23K 9/167 | (2006.01) |
| B23K 9/173 | (2006.01) |
| C22C 19/05 | (2006.01) |
| B23K 101/00 | (2006.01) |
| B23K 103/08 | (2006.01) |
| B23K 103/18 | (2006.01) |

(52) U.S. Cl.
CPC .............. *B23K 9/044* (2013.01); *B23K 9/042* (2013.01); *B23K 9/167* (2013.01); *B23K 9/173* (2013.01); *C22C 19/057* (2013.01); *B23K 2101/001* (2018.08); *B23K 2103/08* (2018.08); *B23K 2103/26* (2018.08)

(58) Field of Classification Search
CPC ........ B23K 9/044; B23K 9/042; B23K 9/173; B23K 9/167; C22C 19/057
See application file for complete search history.

(56) References Cited

U.S. PATENT DOCUMENTS

| | | | | |
|---|---|---|---|---|
| 3,832,522 | A * | 8/1974 | Arikawa | B23K 9/09 219/137 R |
| 4,336,440 | A * | 6/1982 | Cook | B23K 9/127 219/124.34 |

(Continued)

FOREIGN PATENT DOCUMENTS

| | | | | |
|---|---|---|---|---|
| CN | 1039201 | A * | 1/1990 | ............. B23K 9/022 |
| FR | 2986451 | A1 * | 8/2013 | ............. B23K 9/022 |

(Continued)

OTHER PUBLICATIONS

Machine translation of CN-1039201-A, Aug. 2019.*

(Continued)

*Primary Examiner* — Geoffrey S Evans
(74) *Attorney, Agent, or Firm* — McNees Wallace & Nurick LLC

(57) ABSTRACT

In some embodiments, a method of welding includes welding at least one fill bead to fill at least one gap on a substrate with arc scanning by an arc welder. The gap is defined by at least one weld bead on the substrate. The weld beads are non-overlapping. A welded article includes a substrate including a crack-prone superalloy and at least one weld bead and at least one fill bead welded on the substrate. The fill bead, the weld bead, and a heat-affected zone of the substrate are micro-crack-free and macro-crack-free. In some embodiments, a method of welding includes welding weld beads on a substrate and welding fill beads on the substrate with an arc welder while arc scanning. The fill beads fill the gaps between neighboring pairs of weld beads. The fill beads are welded in a non-sequential order.

18 Claims, 3 Drawing Sheets

(56) References Cited

U.S. PATENT DOCUMENTS

| | | | |
|---|---|---|---|
| 5,136,139 A | 8/1992 | Gilliland | |
| 5,897,801 A * | 4/1999 | Smashey | B23K 9/0026 148/524 |
| 7,022,938 B2 | 4/2006 | Tamura et al. | |
| 8,742,294 B2 | 6/2014 | Fukuda et al. | |
| 9,321,117 B2 * | 4/2016 | Beary | B23K 9/324 |
| 2005/0109818 A1 * | 5/2005 | Shimohata | C30B 29/52 228/119 |
| 2013/0032577 A1 * | 2/2013 | Lin | B23K 9/042 219/76.12 |
| 2013/0086911 A1 * | 4/2013 | Lin | B23K 9/042 219/76.14 |
| 2013/0256287 A1 * | 10/2013 | Cole | B23K 9/10 219/122 |
| 2015/0014284 A1 | 1/2015 | Burvelle et al. | |
| 2016/0167172 A1 * | 6/2016 | Goncharov | B23K 26/342 219/76.12 |
| 2018/0207740 A1 * | 7/2018 | Yoshida | B23K 9/127 |
| 2018/0257160 A1 * | 9/2018 | Tatsumi | B23K 9/232 |
| 2019/0022786 A1 * | 1/2019 | Lin | B23K 26/34 |

FOREIGN PATENT DOCUMENTS

| | | | |
|---|---|---|---|
| JP | 57-7383 A | | 1/1982 |
| JP | 2016030283 A | * | 3/2016 |

OTHER PUBLICATIONS

Machine translation of Japan Patent document No. 2016-030,283-A, Aug. 2019.*

Machine translation of France Patent document No. 2,986,451-A1, Aug. 2019.*

Pickin et al., "Characterisation of the cold metal transfer (CMT) process and its application for low dilution cladding", Journal of Materials Processing Technology, vol. 211, pp. 496-502, 2011.

* cited by examiner

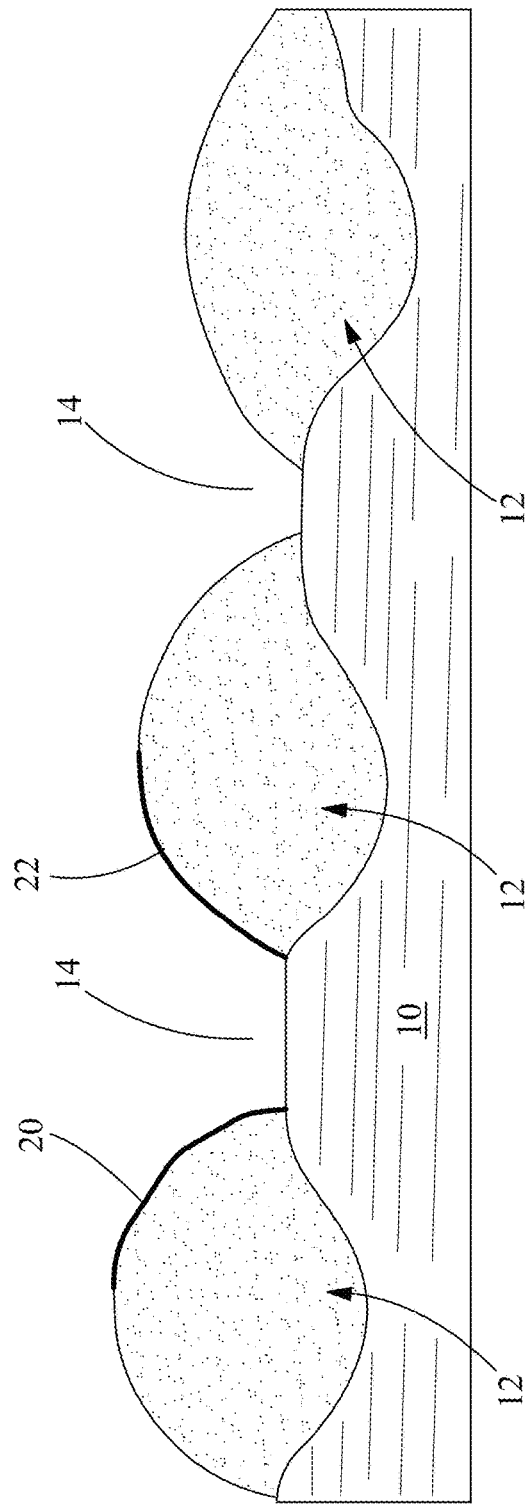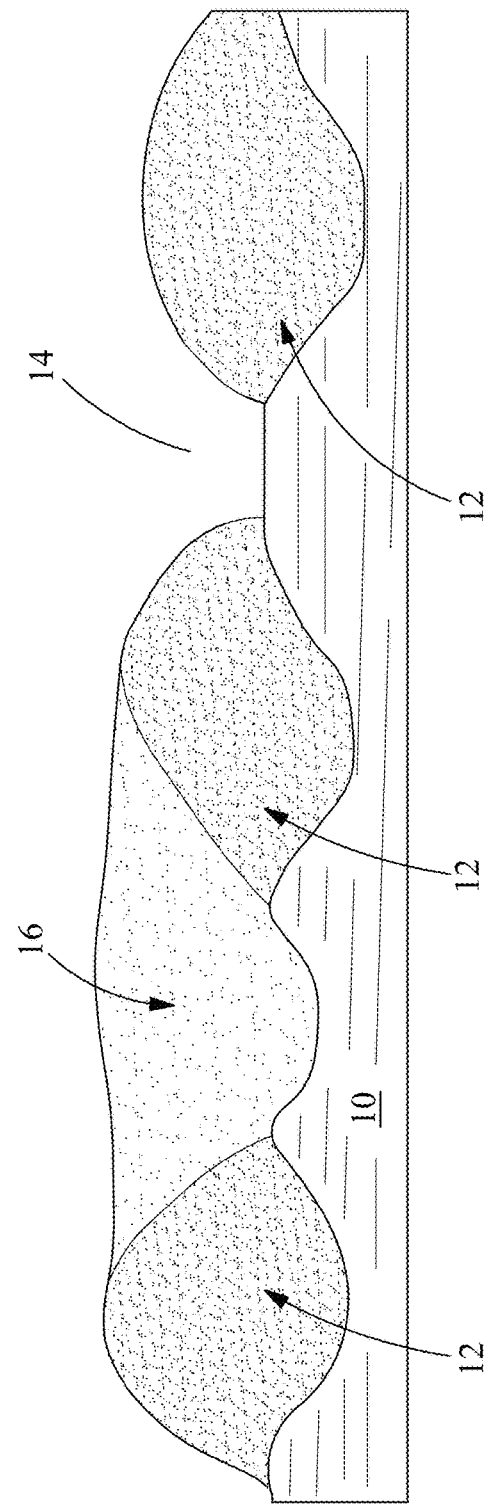

METHOD OF BUILD-UP WELDING

FIELD OF THE INVENTION

The present embodiments are directed to methods of welding and welded articles. More particularly, the present embodiments are directed to methods of build-up welding with low heat input to the substrate and welded articles without cracks generated during the weld.

BACKGROUND OF THE INVENTION

In conventional build-up welding, sequential overlapping rows of weld beads are deposited onto a base material to form the build-up weld area. The base material is conventionally pre-heated to reduce the amount of heat input needed from the welding apparatus during the build-up welding. In crack-prone materials, such as R108 and GTD444, the high amount of heat input to the base material by these conventional methods leads to formation of macro-cracks or micro-cracks during build-up weld deposition to make repairs and complicates the repair of such materials.

The problem is particularly acute in nickel-based superalloys having a high percentage of the gamma prime ($\gamma'$) phase. Larger cracks in the weld deposit may be removed by any kind of dilution with various filler materials, but the removal of micro-cracks in the heat-affected zone is not possible by conventional welding processes. In some cases, brazing plus hot isostatic pressing (HIP) may be able to treat such micro-cracks, but brazing plus HIP is more costly than arc welding.

BRIEF DESCRIPTION OF THE INVENTION

In an embodiment, a method of welding includes welding at least one fill bead to fill at least one gap on a substrate by arc scanning with an arc welder. The gap is defined by at least one weld bead on the substrate. The weld beads are non-overlapping.

In another embodiment, a welded article includes a substrate including a crack-prone superalloy, at least one weld bead non-overlappingly welded to the substrate, and at least one fill bead. Each fill bead is welded to the substrate and to a weld bead or a pair of weld beads to fill at least one gap on the substrate defined by the weld bead or the pair of weld beads. The fill bead, weld bead, and a heat-affected zone of the substrate are micro-crack-free and macro-crack-free.

In another embodiment, a method of welding includes welding a plurality of weld beads on a substrate and welding a plurality of fill beads on the substrate with an arc welder while arc scanning. The weld beads are non-overlapping. The weld beads define gaps formed between neighboring pairs of weld beads. The fill beads are welded to the substrate and to the weld beads on the substrate to fill the gaps. The fill beads are welded in a non-sequential order.

Other features and advantages of the present invention will be apparent from the following more detailed description, taken in conjunction with the accompanying drawings which illustrate, by way of example, the principles of the invention.

BRIEF DESCRIPTION OF THE DRAWINGS

FIG. 1 is a schematic side view in a plane perpendicular to the weld direction of a welded article substrate with three weld beads in an embodiment of the present disclosure.

FIG. 2 is the schematic side view of the welded article of FIG. 1 with a fill bead between two of the weld beads.

Wherever possible, the same reference numbers will be used throughout the drawings to represent the same parts.

DETAILED DESCRIPTION OF THE INVENTION

Figure 3:
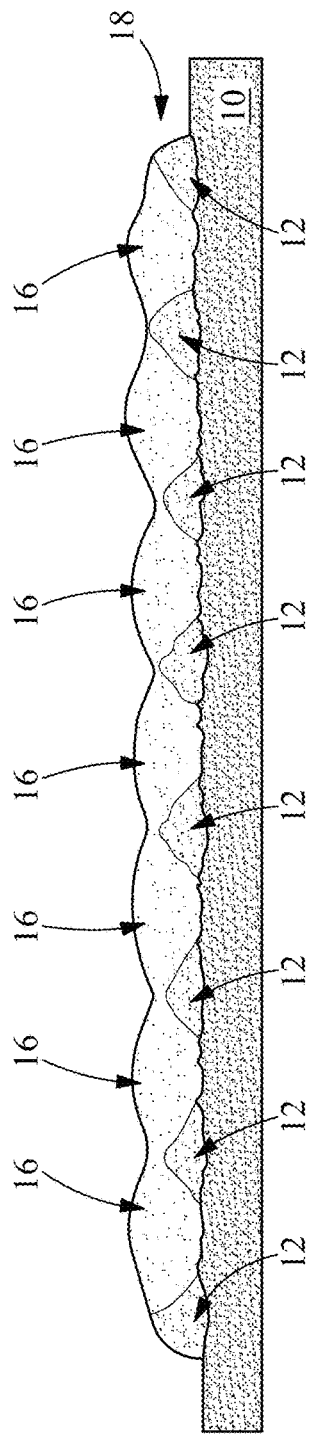
FIG. 3 is a schematic side view of a portion of a completed welded article in an embodiment of the present disclosure.

Provided are methods of build-up welding using arc scanning and build-up welds including one or more fill beads welded to a substrate and to one or more weld beads in a welded article.

Embodiments of the present disclosure, for example, in comparison to concepts failing to include one or more of the features disclosed herein, produce less of a heat-affected zone (HAZ), provide a more uniform heat input, produce less heat input to the substrate, provide a smaller fusion depth, produce less heat concentration in the substrate and the weld, produce a micro-crack-free build-up weld, produce a macro-crack-free build-up weld, produce a crack-free build-up weld, permit repair of mismachined parts from small to large by build-up weld, permit repair of worn parts from small to large by build-up weld, or combinations thereof.

Referring to FIG. 1, a set of weld beads 12 is non-overlappingly welded to a substrate 10 so that there are gaps 14 between the weld beads 12. The weld beads 12 are preferably uniform or substantially uniform in shape along the length of the weld bead 12. The weld beads 12 are preferably applied to the substrate 10 with a predetermined weld bead spacing between each pair of neighboring weld beads 12 such that the gaps 14 formed between the weld beads 12 are channels of a substantially uniform width.

Referring to FIG. 1 and FIG. 2, once the weld beads 12 have been placed, a fill bead 16 is deposited in each gap 14 between neighboring weld beads 12. The fill bead 16 is preferably applied to the gap 14 with arc scanning to distribute heat from the arc laterally with respect to the weld direction along the surface of the gap 14 including the surface contour 20 of the first weld bead 12, the exposed surface of the substrate 10 between the gap 14 and the neighboring weld bead 12, and the surface contour 22 of the neighboring weld bead 12. Each fill bead 16 is preferably welded to the substrate 10 and the neighboring weld beads 12 with complete fusion, without overlapping of neighboring weld beads 12, and without overlapping of neighboring fill beads 16.

Figure 4:
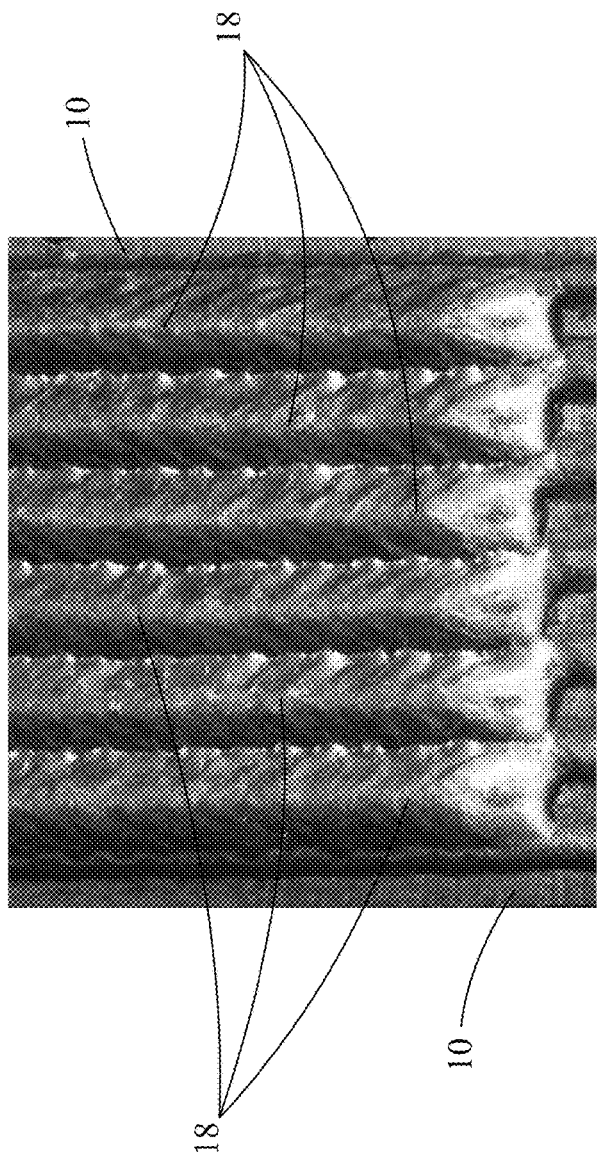
FIG. 4 is a top view of the welded article of FIG. 3 of alternating weld beads and fill beads forming the weld area on the substrate.

Referring to FIG. 3 and FIG. 4, a weld area 18 is built up by filling all of the gaps 14 between weld beads 12 on the substrate 10 with fill beads 16. The height of the fill beads 16 may be greater than, less than, or equal to the height of the weld beads 12. In FIG. 4, the weld beads 12 extend past where the fill beads 16 terminate and so are visible at the bottom of the image.

In some embodiments, the weld is a build-up weld. As used herein, a "build-up weld" is a weld to add material, namely a welding metal, to a substrate 10. In some embodiments, the build-up weld adds material to a substrate 10 to replace material lost from mismachining the substrate 10 during manufacture. In some embodiments, the build-up weld adds material to substrate 10 to replace material lost from wear to the substrate 10 during service.

As used herein, "arc scanning" refers to moving the welding arc of an arc welder back and forth in an oscillatory or shaking manner while generally translating the arc along a weld direction during welding. The arc scanning may be automated or manual.

As used herein, "crack-prone" refers to a tendency of a material to form micro-cracks or macro-cracks when heated to a temperature near but below the melting temperature of the material.

As used herein, "non-overlapping" "non-overlappingly", and "without overlapping" refer to two weld beads being located next to each other with little or no weld material bridging the space between the two weld beads on the substrate. In some embodiments, less than 1% of the weld material of neighboring weld beads overlaps. In some embodiments, none of the weld material of neighboring weld beads overlaps.

Heat management during a build-up welding process produces a crack-free build-up weld, even on a crack-prone substrate material. The heat management significantly reduces the amount of heat applied to the substrate 10 and significantly reduces the size of the HAZ. The build-up welding process may be used to repair a worn component or article removed from service or a mismachined component or article. The build-up welding process preferably occurs with no preheating of the substrate 10. The robust process provides a crack-free metal build-up weld on a crack-prone superalloy.

By the initial deposition of non-overlapping weld beads 12 on the substrate 10, the heat from the arc welding and from the weld beads 12 is better managed. The heat is more uniformly distributed on the substrate 10 and the heat concentration below the weld beads 12 is reduced in comparison to a conventional build-up weld process of applying a series of overlapping weld beads 12 to form the weld area, where each newly-placed weld bead 12 overlaps the previously-placed weld bead 12. The weld beads 12 may be applied to the substrate 10 by a conventional straight weld without arc scanning. For even better heat management, however, the weld beads 12 may be applied with arc scanning to distribute the heat from the arc laterally with respect to the weld direction for a width corresponding to or substantially corresponding to the width of the base of the weld bead 12.

The weld beads 12 are fully fused to the substrate 10, which requires melting of a surface layer of the substrate 10 by the weld arc during the welding process. A filler material applied to the surface of the substrate 10 dilutes the substrate material and lowers the melting temperature at the surface of the substrate 10. Although a weld arc provides an uneven Gaussian distribution of heat, arc scanning during the welding of the weld beads 12 allows a more uniform distribution of heat across the substrate 10 below where the weld bead 12 is applied. Sufficient melting for full fusion is achieved with a lower temperature maximum in the substrate 10 with arc scanning than without arc scanning. For further heat management, reduction of the amount of heat applied to the substrate 10, and reduction of the size of the HAZ, the weld beads 12 may be placed in non-sequential order or a period of time may be allowed for the substrate 10 to cool between welding of certain weld beads 12.

By the subsequent deposition of fill beads 16 with arc scanning in the gaps 14 between neighboring weld beads 12 on the substrate 10 and on the flanking surfaces of the neighboring weld beads 12, the heat from the arc welding and from the fill beads 16 is better managed. The heat is more uniformly distributed on the substrate 10 and the neighboring weld beads 12, and the heat concentration below the fill beads 16 is reduced in comparison to a process of applying the fill beads 16 without arc scanning. The fill beads are applied with arc scanning to distribute the heat from the arc laterally with respect to the weld direction for a width corresponding to or substantially corresponding to the width of the fill bead 16.

The fill beads 16 are fully fused to the substrate 10 and the flanking surfaces of the neighboring weld beads 12, which requires melting of a surface layer of the substrate 10 and the flanking surfaces of the neighboring weld beads 12 by the weld arc during the welding process. A filler material applied to the surface of the substrate 10 and the flanking surfaces of the neighboring weld beads 12 lowers the melting temperature at the surface of the substrate 10 and the flanking surfaces of the neighboring weld beads 12. Arc scanning during the welding of the fill beads 16 allows a more uniform distribution of heat across the substrate 10 and the flanking surfaces of the neighboring weld beads 12 below where the fill bead 16 is applied. Sufficient melting for full fusion is achieved with a lower temperature maximum in the substrate 10 and flanking weld beads 12 with arc scanning than without arc scanning. For further heat management, reduction of the amount of heat applied to the substrate 10 and neighboring weld beads 12, and reduction of the size of the HAZ, the fill beads 16 may be placed in non-sequential order or a period of time may be allowed for the substrate 10 and weld beads 12 to cool between welding of certain fill beads 16.

The resulting build-up weld is preferably fully fused, pore-free, and crack-free. Depending on the article or component, the build-up weld may be machined and the article or component may be heat treated after completion of the build-up weld and prior to being returned to or placed in service.

Figure 5:
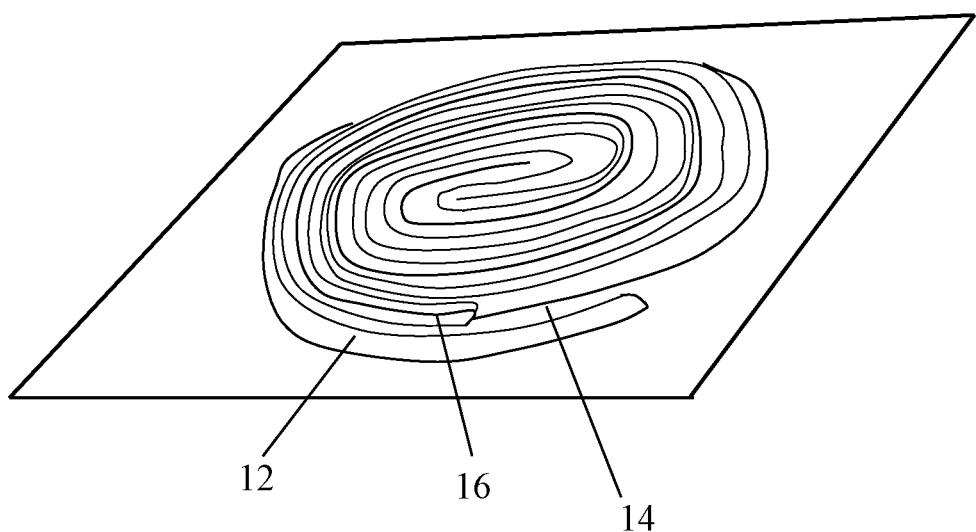
FIG. 5 is a schematic top view of a welded article with a spiral weld bead.
Figure 6:
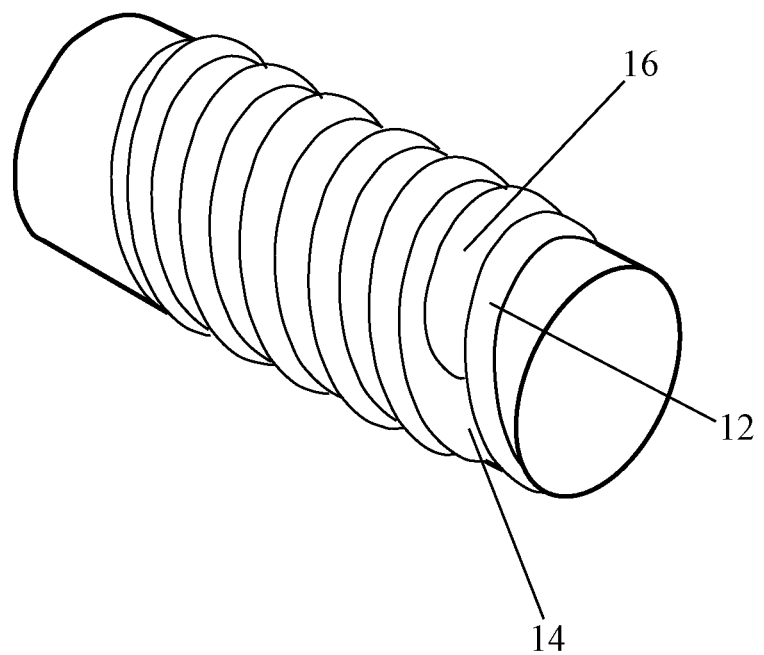
FIG. 6 is a schematic perspective view of a welded article with a corkscrew weld bead.

The weld beads 12 may be located on a surface in any manner such that the weld beads 12 are non-overlapping and the weld beads 12 form at least one gap 14, where each gap 14 is of an appropriate width to be filled by a fill bead 16. In some embodiments, the substrate 10 has a flat or substantially flat surface and the weld beads 12 are discontinuous straight beads arranged parallel to each other to form a straight channel between each pair of neighboring discontinuous straight beads. In some embodiments, the substrate 10 has a flat or substantially flat surface and the weld bead 12 is a non-overlapping continuous curved bead, such as a spiral, as shown in FIG. 5, that forms a continuous curved gap 14 between neighboring portions of the continuous curved bead. In some embodiments, the substrate has a curved surface. In some embodiments, the substrate 10 is cylindrical or substantially cylindrical and the weld beads 12 are discontinuous rings arranged parallel to each other on the curved surface to provide gaps 14 that are circular channels between each pair of neighboring rings. In some embodiments, the substrate 10 is cylindrical or substantially cylindrical and the weld bead 12 is a non-overlapping continuous corkscrew around the curved surface of the cylinder that forms a continuous gap 14 in a corkscrew progression around the curved surface, as shown in FIG. 6. In other embodiments, the substrate 10 has an irregular or non-uniform surface shape.

The method may have many applications, including, but not limited to, hardfacing, salvaging of mismachined new makes, service of in-service components or articles, or repair of in-service components or articles, including, but not limited to, turbine shrouds, turbine nozzles, or turbine buckets.

In some embodiments, the method is carried out manually. In other embodiments, the method is automated, such as by a robot or a computer. In some embodiments, the method builds up a weld on a damaged article to restore the dimensions to the component or article or otherwise repair the component or article.

In some embodiments, the fill beads 16 are formed with a high-speed arc scanning/shaking/oscillating welding process to build up more metal or fill cavities or cracks on crack-prone materials that are typically used in turbines, including, but not limited to, nozzles, buckets, and shrouds. In some embodiments, the process provides a weld fusion depth of less than about 0.5 mm (about 0.020 in) so that the heat-affected zone (HAZ) does not have a chance to build up heat to a high enough temperature to affect the microstructure of the substrate 10 in the HAZ. The arc moving speed is preferably in the range of about 2 m/min to about 5 m/min (about 80 inches per minute (ipm) to about 200 ipm).

In some embodiments, the method includes placing a group of non-overlapping weld beads 12 with a center-to-center distance in the range of about 4 mm to about 5 mm (about 0.15 in to about 0.2 in) between any two neighboring weld beads 12 and depositing fill beads 16 to fill the gap 14 between each pair of weld beads 12 by using the arc scanning, shaking, or oscillating. The method, according to certain embodiments of the present disclosure, allows the heat to be distributed more evenly on the substrate 10 when placing the weld beads 12 and the fill beads 16. The arc, which may be either tungsten inert gas (TIG) or metal inert gas (MIG), is maintained in a moving condition, more specifically in a high-speed shaking condition, at all times when making the fill beads 16. When operating with a manual welding torch, the torch is shaken continuously with the wrist at all times. As noted above, the amplitude of the oscillation is preferably selected such that the arc welder deposits material along a path back and forth between the surface contour line 20 of the first weld bead 12 to the surface contour line 22 of the neighboring weld bead 12 while simultaneously translating in the welding direction to build up the fill bead 16 until the gap 14 is sufficiently filled.

In some embodiments, the weld beads 12 are built up on the substrate 10 without overlapping at a welding speed in the range of about 1.5 m/min to about 3 m/min (about 60 ipm to about 120 ipm). The heat is more evenly distributed by placing the weld beads 12 in non-overlapping locations of the welded area and then placing the fill beads 16 in the gaps 14 between the weld beads 12. In some embodiments, the weld beads 12 are spaced in the range of about 4 mm to about 6 mm (about 0.16 in to about 0.24 in) apart center-to-center. The fill beads 16, applied with arc scanning at welding speeds up to about 3 m/min (about 120 ipm), fill the gaps 14 generated between every pair of neighboring weld beads 12. The fill beads 16 are also preferably non-overlapping.

In some embodiments, single weld deposits are made on a flat substrate 10 without overlapping or a spiral weld deposit is made on a curved surface of a cylinder without overlapping. The empty space between weld deposits created during the single weld deposits is then filled with arch scanning to apply the arc on those weld toes for a complete fusion to make a deposit layer. The fill beads 16 sufficiently fill the empty space between pairs of weld deposits with arc scanning that preferably covers the neighboring two half-sides of the two previously-made weld beads 12, or for a curved surface the fill bead 16 fills the empty space between the weld bead 12 to complete a weld build-up on the surface of the substrate 10.

The arc scanning reduces the heat concentration of the substrate 10 at the gap 14 during the deposition of the fill bead 16. Also, by the deposition of non-overlapping fill beads 16 in the gaps 14, the heat from the fill beads 16 is more uniformly distributed on the substrate 10 and on a portion of the weld beads 12, and the heat concentration below the fill beads 16 is reduced in comparison to applying a series of overlapping weld beads 12 or fill beads 16 to form the weld area, where each newly-placed weld bead 12 or fill bead 16 overlaps the previously-placed weld bead 12 or fill bead 16.

The fill beads 16 may be applied to fill the gaps 14 sequentially or alternatively in a non-sequential order to minimize the heat concentration and maximize the uniformity of the heat distribution on the substrate 10 and the weld beads 12. In some embodiments, the non-sequential order is a predetermined order selected to reduce or minimize the size of the HAZ.

In some embodiments, the substrate 10 includes a material that is generally considered to be unweldable for one reason or another. In some embodiments, the substrate 10 is a crack-prone superalloy.

In some embodiments, the welding wire is N263. In some embodiments, the welding wire is IN625. In some embodiments, the substrate 10 is R108. In some embodiments, the substrate 10 is GTD444.

As used herein, "N263" refers to an alloy including a composition, by weight, of between about 19% and about 21% chromium (Cr), between about 19% and about 21% cobalt (Co), between about 5.6% and about 6.1% molybdenum (Mo), between about 1.9% and about 2.4% titanium (Ti), up to about 0.6% aluminum (Al), up to about 0.6% manganese (Mn), up to about 0.4% silicon (Si), up to about 0.2% copper (Cu), incidental impurities, and a balance of nickel (Ni).

As used herein, "IN625" refers to an alloy including a composition, by weight, of between about 20% and about 23% Cr, between about 8% and about 10% Mo, up to about 5% iron (Fe), between about 3.2% and about 4.2% niobium (Nb) plus tantalum (Ta), up to about 1% Co, up to about 0.5% Mn, up to about 0.5% Si, up to about 0.4% Al, up to about 0.4% Ti, up to about 0.1% carbon (C), incidental impurities, and a balance (at least 58%) of Ni.

As used herein, "R108" refers to an alloy including a composition, by weight, of between about 9% and about 10% Co, between about 9.3% and about 9.7% tungsten (W), between about 8.0% and about 8.7% Cr, between about 5.25% and about 5.75% Al, between about 2.8% and about 3.3% Ta, between about 1.3% and about 1.7% hafnium (Hf), up to about 0.9% Ti (for example, between about 0.6% and about 0.9% Ti), up to about 0.6% Mo (for example, between about 0.4% and about 0.6% Mo), up to about 0.2% Fe, up to about 0.12% Si, up to about 0.1% Mn, up to about 0.1% Cu, up to about 0.1% C (for example, between about 0.07% and about 0.1% C), up to about 0.1% Nb, up to about 0.02% zirconium (Zr) (for example, between about 0.005% and about 0.02% Zr), up to about 0.02% boron (B) (for example, between about 0.01% and about 0.02% B), up to about 0.01% phosphorus (P), up to about 0.004% sulfur (S), incidental impurities, and a balance of Ni.

As used herein, "GTD444" refers to an alloy including a composition, by weight, of about 9.75% Cr, about 7.5% Co, about 6.0% W, about 4.2% Al, about 4.8% Ta, about 3.5% Ti, about 1.5% Mo, about 0.08% C, about 0.009% Zr, about 0.009% B, incidental impurities, and a balance of Ni.

Implementation of the process using N263 as the welding wire on R108 and GTD444 slabs showed no crack in the weld and HAZ in the as-welded condition, solution heat treated condition, and solution-plus-aging condition. This process may be used for other materials as well and may be used either on new materials or in the repair or servicing of used materials.

Arc scanning, shaking, or oscillating at a high speed in the range of about 2 m/min to about 5 m/min (about 80 ipm to about 200 ipm) reduces the heat concentration so as to reduce the fusion depth of each weld to less than about 0.5 mm (about 0.020 in) so that the HAZ does not have a chance to be heated to a temperature where macro- or micro-cracks develop.

A two-step welding process, according to the present disclosure, minimizes the cracking formation opportunity either on the weld or in the HAZ. The process may be implemented to salvage a turbine component, including, but not limited to, a nozzle, a bucket, or a shroud. The process may be implemented either on new materials or in repairing or servicing used materials.

EXAMPLES

The efficacy of the process was demonstrated in comparison to conventional welding processes. In a conventional process, beads were built up with no arc scanning, which led to crack formation. In the present process, arc scanning at welding speeds up to about 5 m/min (about 200 ipm) produced no cracking concerns in the weld or the HAZ and produced a fusion depth less than about 0.25 mm (about 0.01 in).

Example 1

A conventional MIG (gas metal arc welding) or TIG (gas tungsten arc welding) weld without arc scanning to weld a bead of N263 on an R108 slab produced a crack in the HAZ that measured about 2.00 mm (about 0.079 in) in length.

Example 2

The process successfully welded an R108 slab substrate 10 with N263 as the welding wire. First, a conventional MIG weld without arc scanning was performed to deposit a set of weld beads 12. The weld beads 12 each measured about 3.0 mm to about 3.6 mm (about 0.12 in to about 0.14 in) across and were spaced at about 4.1 mm to about 4.3 mm (about 0.16 in to about 0.17 in) apart (center-to-center). Then, a set of fill beads 16 was deposited to fill in the gaps 14 between the weld beads 12 using a cold metal transfer (CMT) MIG welder with arc scanning at an arc scanning speed of about 3 m/min (about 120 ipm) while shaking the torch all the time.

The welds were then evaluated for three different conditions: as welded, after a post-weld solution heat treatment at about 1120° C. (about 2050° F.) for about two hours, and after a post-weld solution heat treatment at about 1120° C. (about 2050° F.) for about two hours followed by an aging heat treatment at about 845° C. (about 1550° F.) for about four hours. The cut-up evaluation showed that the materials were crack-free in the welds and in the HAZs for the fill bead 16 welds. The fusion depth of the fill beads 16 was less than about 0.25 mm (about 0.010 in).

Example 3

The process successfully welded an R108 slab substrate 10 with IN625 as the welding wire. The welds were evaluated for three different conditions: as welded, after a post-weld solution heat treatment at about 1120° C. (about 2050° F.) for about two hours, and after a post-weld solution heat treatment at about 1120° C. (about 2050° F.) for about two hours followed by an aging heat treatment at about 845° C. (about 1550° F.) for about four hours. The cut-up evaluation showed that the materials were crack-free in the welds and in the HAZs for the fill bead 16 welds.

Example 4

The process successfully welded a GTD444 slab substrate 10 with N263 as the welding wire. The welds were evaluated for three different conditions: as welded, after a post-weld solution heat treatment at about 1120° C. (about 2050° F.) for about two hours, and after a post-weld solution heat treatment at about 1120° C. (about 2050° F.) for about two hours followed by an aging heat treatment at about 845° C. (about 1550° F.) for about four hours. The cut-up evaluation showed that the materials were crack-free in the welds and in the HAZs for the fill bead 16 welds.

While the invention has been described with reference to one or more embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. In addition, all numerical values identified in the detailed description shall be interpreted as though the precise and approximate values are both expressly identified.

What is claimed is:

1. A method of welding comprising:
providing an article comprising a substrate and at least one weld bead non-overlappingly welded to the substrate, the at least one weld bead on the substrate defining at least one gap; and then
welding at least one fill bead to fill the at least one gap on the substrate with arc scanning by an arc welder to provide a build-up weld;
wherein the arc scanning comprises moving a welding arc of the arc welder back and forth in an oscillatory manner while translating the arc along a weld direction during welding.

2. The method of claim 1, wherein the arc scanning comprises oscillating the arc welder back and forth between surface contour lines of the at least one weld bead and the substrate defining the at least one gap.

3. The method of claim 1, wherein the substrate comprises a crack-prone superalloy.

4. The method of claim 3, wherein the crack-prone alloy is selected from the group consisting of a first composition, by weight, of between 9% and 10% cobalt (Co), between 9.3% and 9.7% tungsten (W), between 8.0% and 8.7% chromium (Cr), between 5.25% and 5.75% aluminum (Al), between 2.8% and 3.3% tantalum (Ta), between 1.3% and 1.7% hafnium (Hf), up to 0.9% titanium (Ti), up to 0.6% molybdenum (Mo), up to 0.2% iron (Fe), up to 0.12% silicon (Si), up to 0.1% manganese (Mn), up to 0.1% copper (Cu), up to 0.1% carbon (C), up to 0.1% niobium (Nb), up to 0.02% zirconium (Zr), up to 0.02% boron (B), up to 0.01% phosphorus (P), up to 0.004% sulfur (S), incidental impurities, and a balance of nickel (Ni) and a second composition, by weight, of 9.75% Cr, 7.5% Co, 6.0% W, 4.2% Al, 4.8% Ta, 3.5% Ti, 1.5% Mo, 0.08% C, 0.009% zirconium (Zr), 0.009% B, incidental impurities, and a balance of Ni.

5. The method of claim 1, wherein the at least one fill bead, the at least one weld bead, and a heat-affected zone of the substrate below the at least one fill bead and the at least one weld bead are micro-crack-free and macro-crack-free.

6. The method of claim 1, wherein the arc welder is a metal inert gas (MIG) welder.

7. The method of claim 1, wherein the arc welder is a tungsten inert gas (TIG) welder.

8. The method of claim 1 further comprising welding the at least one weld bead to the substrate to form the at least one gap.

9. The method of claim 1, wherein the welding produces a fusion depth into the substrate of about 0.5 mm or less.

10. The method of claim 1, wherein the at least one weld bead comprises a plurality of weld beads and the at least one fill bead comprises a plurality of fill beads, the method comprising welding the plurality of fill beads to the substrate and to the plurality of weld beads in a non-sequential order.

11. The method of claim 1, wherein the at least one gap has a center-to-center width in the range of about 4 mm to about 6 mm.

12. The method of claim 1, wherein the welding occurs at an arc moving speed in the range of about 2 m/min to about 5 m/min.

13. The method of claim 1, wherein the fill beads and the weld beads form a build-up weld.

14. The method of claim 1, wherein the substrate is part of a turbine component.

15. The method of claim 1, wherein the substrate has a flat surface and the at least one weld bead is a non-overlapping spiral bead.

16. The method of claim 1, wherein the substrate is cylindrical and the at least one weld bead is a non-overlapping continuous corkscrew bead around a curved surface of the cylinder that forms the at least one gap around the curved surface.

17. A method of welding comprising:
welding a plurality of weld beads on a substrate, wherein the plurality of weld beads are non-overlapping, the plurality of weld beads defining a plurality of gaps formed between neighboring pairs of the plurality of weld beads; and then
welding a plurality of fill beads on the substrate with an arc welder while arc scanning, the fill beads being welded to the substrate and to the weld beads on the substrate to fill the gaps to provide a build-up weld, wherein the fill beads are welded in a non-sequential order;
wherein the arc scanning comprises moving a welding arc of the arc welder back and forth in an oscillatory manner while translating the arc along a weld direction during welding.

18. The method of claim 17, wherein the substrate comprises a crack-prone superalloy, and the weld beads and a heat-affected zone of the substrate are micro-crack-free and macro-crack-free after the welding.

* * * * *